United States Patent [19]
Tanabe

[11] Patent Number: 5,749,003
[45] Date of Patent: May 5, 1998

[54] CAMERA HAVING FLASH DEVICE

[75] Inventor: Minoru Tanabe, Kawasaki, Japan

[73] Assignee: Canon Kabushiki Kaisha, Tokyo, Japan

[21] Appl. No.: 692,052

[22] Filed: Aug. 2, 1996

[30] Foreign Application Priority Data

Aug. 8, 1995 [JP] Japan .................................. 7-202395
Oct. 12, 1995 [JP] Japan .................................. 7-264408

[51] Int. Cl.$^6$ ............................ G03B 15/05; G03B 17/04
[52] U.S. Cl. ................................. 396/177; 396/349
[58] Field of Search ............................. 396/178, 348, 396/177, 349, 176

[56] References Cited

U.S. PATENT DOCUMENTS 5,546,147 8/1996 Baxter et al. ........................ 396/178

Primary Examiner—A. A. Mathews
Attorney, Agent, or Firm—Robin, Blecker & Daley

[57] ABSTRACT

A camera having a flash device and a film accommodating chamber includes a flash emitting unit arranged to be movable between a use position and a stowage position, a driving part arranged to drive a lens sleeve so as to move an optical element disposed within the lens sleeve, a first member arranged to move in association with a movement of the lens sleeve, a second member arranged to drive the flash emitting unit, and a spring member arranged to interconnect the first member and the second member to transmit a movement of the first member to the second member, wherein the spring member is located between the lens sleeve and the film accommodating chamber.

12 Claims, 12 Drawing Sheets

CAMERA HAVING FLASH DEVICE

BACKGROUND OF THE INVENTION

1. Field of the Invention

This invention relates to a camera having a built-in flash device, and more particularly to a camera in which a flash emitting unit of the built-in flash device is arranged to be movable between a stowage position and a use position.

2. Description of the Related Art

Cameras of the kind having a built-in flash device have been variously arranged and commercialized. Meanwhile, a recent trend of furthering the compactness of cameras is causing a distance between the optical axis of a photo-taking lens and the optical axis of the built-in flash device to become shorter in the cameras of this kind. It is another trend to arrange the photo-taking lenses of these cameras to have a higher magnifying power, which tends to cause a photo-taking distance between the cameras and objects to become longer.

As a result, the so-called red-eye phenomenon is apt to be brought about, in which flash light emitted from the flash device falls on a pupil of the object (person) and is reflected by a retina of the person. It is important to prevent the red-eye phenomenon for cameras to be commercialized. Known methods for preventing the red-eye phenomenon include (1) a method of moving the flash emitting unit of a flash device away from the optical axis of the photo-taking lens in using the flash device and (2) a method of causing the flash device to make a preliminary emission or causing a light source (a lamp or the like) other than the flash device to emit light immediately before photographing in such a way as to cause the pupil of the object (person) to contract. It is also known to combine the two methods (1) and (2).

The method (1) of moving the flash emitting unit away from the optical axis of the photo-taking lens in using the flash device has been generally carried out by sliding the flash emitting unit of the flash device in the direction of orthogonally intersecting the optical axis of the photo-taking lens of the camera to cause the flash emitting unit either to protrude above the camera body or from one side of the camera.

For driving the flash emitting unit, it is generally practiced to arrange a spring to constantly urge the flash emitting unit to move toward the use position (protruding position), to keep the flash emitting unit in the stowage position against the urging force of the spring by means of a known lock mechanism when the flash device is not used, to cause the lock mechanism to unlock by manually operating a manual operation member in such a way as to allow the flash emitting unit to protrude to the use position when the flash device is to be used and, at the same time as the protruding motion of the flash emitting unit, to turn on an electric circuit which is arranged to control the light emitting action of the flash device. Further, as a result of advancement of the automatic camera operating arrangement, the lock mechanism has come to be sometimes arranged to automatically unlock the flash emitting unit according to the luminance of the object detected by the camera.

In another mode of carrying out the method for moving the flash emitting unit away from the optical axis of the photo-taking lens, the flash emitting unit is arranged to be movable between the stowage position and the use position by turning the flash emitting unit on an axis which is orthogonal to the optical axis of the photo-taking lens and extends in the widthwise direction of the camera body. This mode has the following advantages. The vertical dimension of the flash emitting unit obtained when in the stowage position can be lessened. In the stowage position, an optical member disposed in front of the flash emitting unit is covered and hidden, so that the flash emitting unit is protected from being damaged and more latitude for design work is allowed. Besides, that mode permits reduction in size of a driving mechanism. On account of these advantages, that mode has come to be often employed.

Like in the mode of sliding the flash emitting unit, in the mode of moving the flash emitting unit between the stowage position and the use position by turning the flash emitting unit on the axis which extends in the widthwise direction of the camera body, the flash emitting unit is also always urged toward the use position by means of a spring and is normally kept in the stowage position by means of a lock mechanism. In using the flash device, the flash emitting unit is unlocked by an operation member manually operated by the camera operator and is allowed to protrude to the use position.

In addition, in Japanese Laid-Open Patent Application No. HEI 6-242497, there is disclosed a camera arranged to move a flash emitting unit between a stowage position and a use position in association with a movement of a lens barrel which is driven by a motor. With the flash emitting unit arranged to be moved between the stowage position and the use position with a drive source such as a motor like in this case, if some force is inadvertently exerted on the flash emitting unit while the flash emitting unit is moving, a power transmission mechanism provided between the motor and the flash emitting unit might be damaged. To prevent such a damage, the camera must be provided with some mechanism for absorbing such an inadvertent force. Hence, in the camera disclosed in Japanese Laid-Open Patent Application No. HEI 6-2424797, an absorbing mechanism is provided around the flash emitting unit.

SUMMARY OF THE INVENTION

This invention is directed to an improvement on the arrangement of the prior art described above.

In accordance with one aspect of this invention, in a camera having a flash device and a film accommodating chamber, a flash emitting unit is arranged to move between a use position and a stowage position in association with a movement of a lens sleeve, and a spring member arranged to interconnect a first member which moves in association with the movement of the lens sleeve and a second member which drives the flash emitting unit is disposed between the lens sleeve and the film accommodating chamber, so that efficient utilization of space is attained for reduction in size of the camera.

The above and other objects and feature of this invention will become apparent from the following detailed description of preferred embodiments thereof taken in connection with the accompanying drawings.

DETAILED DESCRIPTION OF THE PREFERRED EMBODIMENTS

(First Embodiment)

Figure 1:
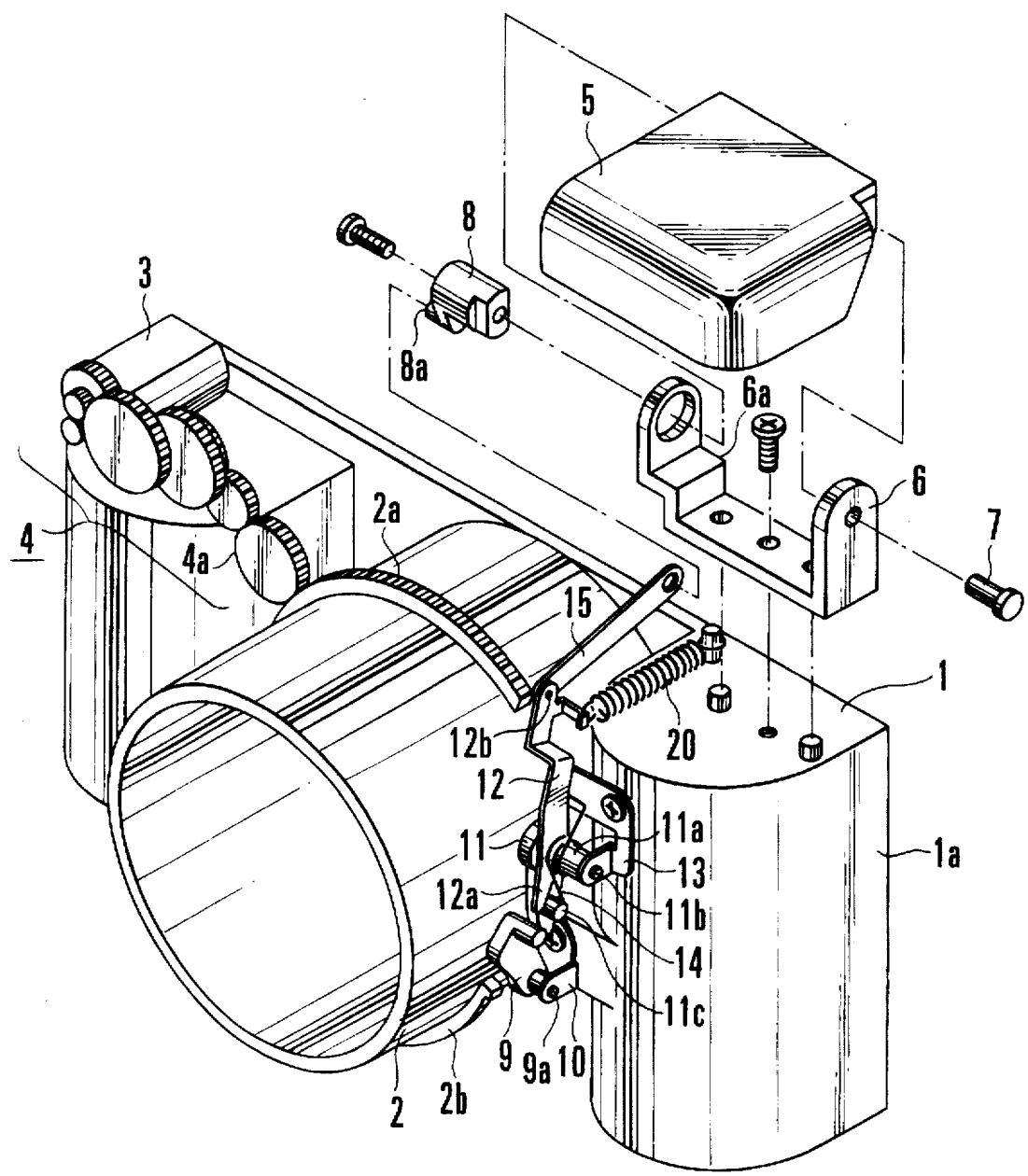
FIG. 1 is an exploded oblique view showing a camera arranged as a first embodiment of this invention.
Figure 2:
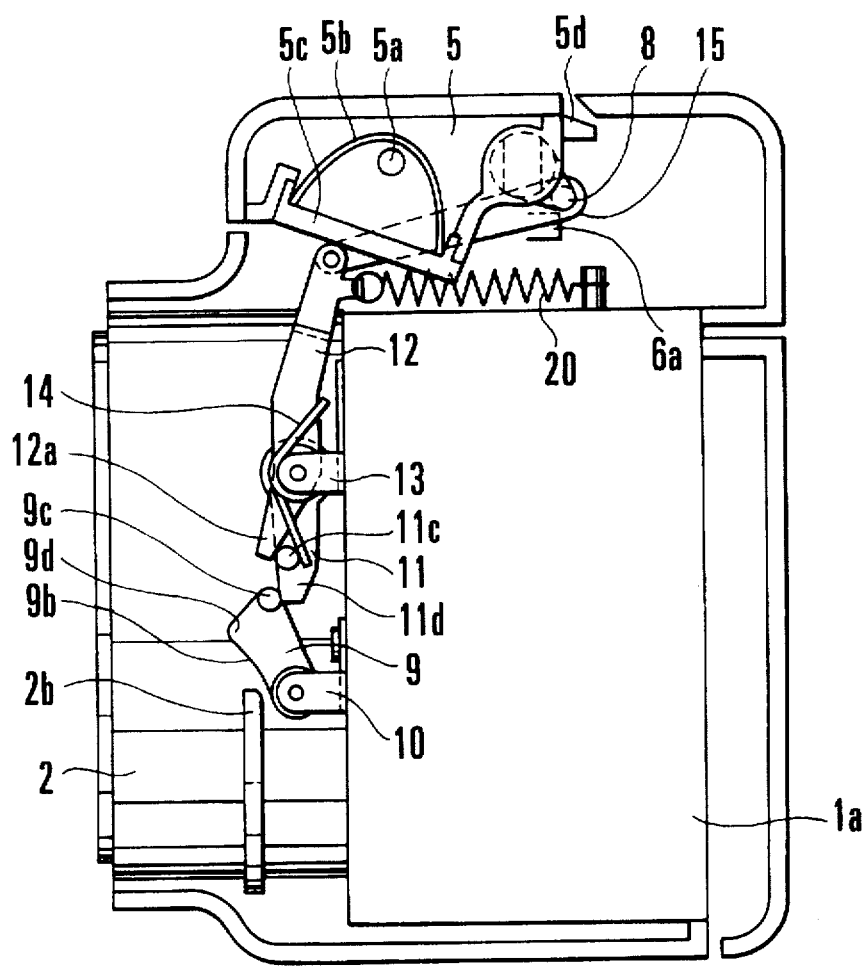
FIG. 2 is a sectional view showing the camera of FIG. 1 in a state in which a flash emitting unit is in a stowage position.
Figure 8:
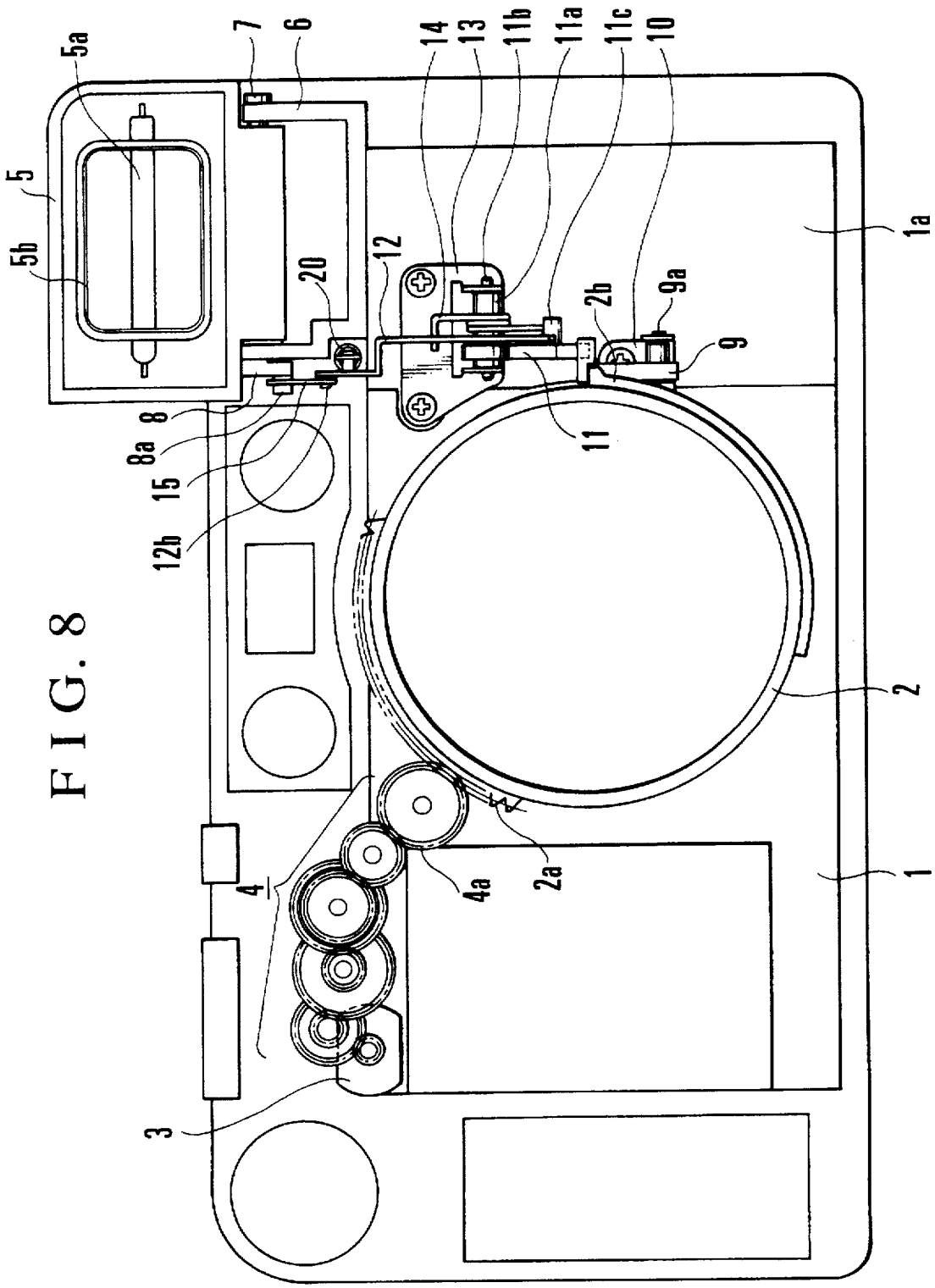
FIG. 8 is a front view showing the camera in the state shown in FIG. 3.
Figure 9:
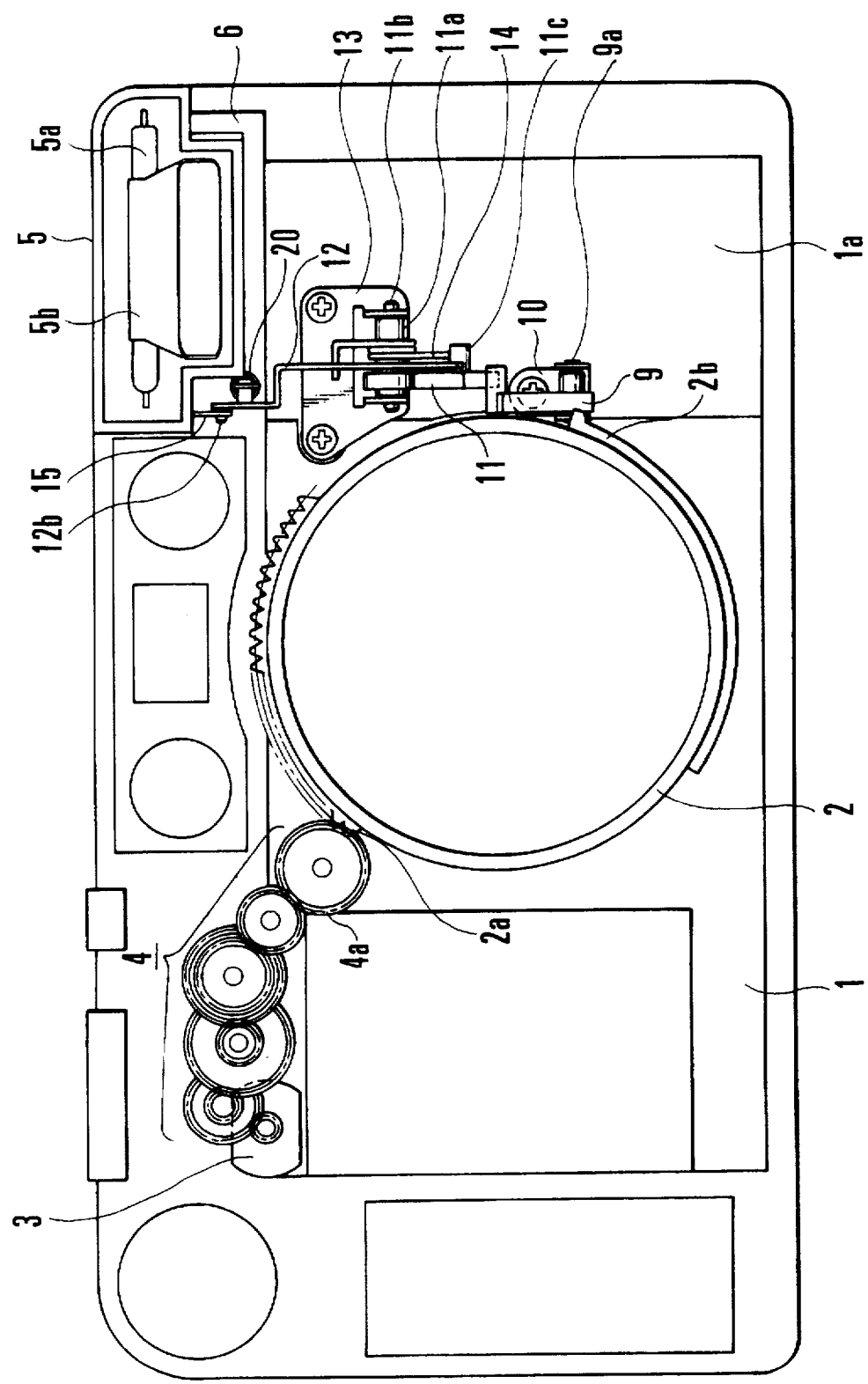
FIG. 9 is a front view showing the camera in the state shown in FIG. 2.

FIGS. 1 to 5, 8 and 9 show a camera arranged as a first embodiment of this invention. In FIGS. 1 and 2, the camera is shown as in a state in which a flash emitting unit is in a stowage position. FIG. 9 is a front view showing the camera in the state shown in FIG. 2. Referring to these drawings, a camera body 1 includes a film accommodating chamber 1a such as a film cartridge chamber or a spool chamber in which a spool shaft is disposed. A lens sleeve 2 which is provided for causing a photo-taking lens (not shown) to move back and forth is mounted on the camera body 1 in such a way as to be rotatable on the optical axis of the photo-taking lens.

The photo-taking lens is arranged to be moved back and forth in association with the rotation of the lens sleeve 2 through a known arrangement composed of a cam groove and a cam follower. A motor 3 is provided for rotating the lens sleeve 2. A gear 4a which is in the last stage of a reduction gear train 4 transmits the power of the motor 3 to the lens sleeve 2 by meshing with a peripheral gear 2a of the lens sleeve 2.

A flash emitting unit 5 includes a discharge tube 5a and a reflection shade 5b, which are arranged inside of the flash emitting unit 5. A transparent window 5c covers the front side of the flash emitting unit 5. The discharge tube 5a and the reflection shade 5b are electrically connected by lead wires (not shown) to a circuit board which is arranged to control flash emission. The flash emitting unit 5 is set on a base (pedestal) 6 mounted on the camera body 1 to extend in the direction of the width of the camera body as a bearing member and is rotatably supported on its right and left sides by a support shaft 7 and a crank 8 which is a driving shaft and is arranged to be coaxial with the shaft 7.

A first lever 9 is provided for transmitting the force of the lens sleeve 2 to the flash emitting unit 5. The first lever 9 is set on a base (pedestal) 10 provided as a bearing member in a front part of the camera body 1 and is swingably supported by a pair of shafts 9a which are extending right and left on both sides the first lever 9 (in front and in rear as viewed on the drawing).

Reference numerals 11 and 12 denote second and third levers, respectively. The third lever 12 is swingably fitted on a shaft 11a of the second lever 11a. In this state, the second lever 11 is swingably supported by the camera body through a base 13 at two shafts 11b (located in front and in rear as viewed on the drawing). A torsion spring 14 has one end thereof hooked on a shaft 11c of the second lever 11 and the other end hooked on the third lever 12. A protruding part 12a of the third lever 12 abuts on the shaft 11c of the second lever 11. Therefore, in the state shown in FIG. 2, the shaft 11c prevents the third lever 12 from swinging counterclockwise any further from its position shown. One end of a connection rod 15 is supported rotatably by a shaft 12b of the third lever 12 and the other end of the connection rod 15 is supported rotatably by a shaft 8a of the crank 8. With the connection rod 15 arranged in this manner, a crank mechanism is formed between the third lever 12 and the flash emitting unit 5.

A spring 20 which is provided for urging the flash emitting unit 5 to move toward the stowage position has one end hooked on the camera body 1 and the other end hooked on the fore end of the third lever 12.

The operation of the first embodiment is next described as follows.

FIGS. 1, 2 and 9 show the camera in a state in which a power supply switch of the camera is turned off and the photo-taking lens is retracted. With the camera in this state, when the power supply switch of the camera is turned on, the motor 3 is energized in such a way as to rotate counterclockwise as viewed in FIG. 1. The rotation of the motor 3 is transmitted through the reduction gear train 4 to the lens sleeve 2. Then, the lens sleeve 2 begins to rotate counterclockwise. A rib-like protruding part 2b formed on the outer circumferential side of the lens sleeve 2 then gradually comes from a first position located away from the first lever 9 to a position closer to the first lever 9 and abuts on the first lever 9. When the lens sleeve 2 rotates further, the rib-like protruding part 2b tries to ride on a slanting face 9b of the first lever 9. At this moment, since the position in the forward and backward directions of the lens sleeve 2 is restricted in its rotatable state, the first lever 9 is pushed to swing clockwise on the shafts 9a as viewed in FIG. 2. At the same time, another shaft 9c of the first lever 9 pushes down a fore end part 11d of the second lever 11. Since the third lever 12 is being pushed counterclockwise against the second lever 11 by the torsion spring 14, the third lever 12 tries to swing counterclockwise together with the second lever 11. Incidentally, at that instant, an urging force of the spring 20 is acting on the other end of the third lever 12 to urge the flash emitting unit 5 toward the stowage position. However, the torsion spring 14 has a load setting value large enough for protruding the flash emitting unit 5 while elongating the spring 20.

Figure 3:
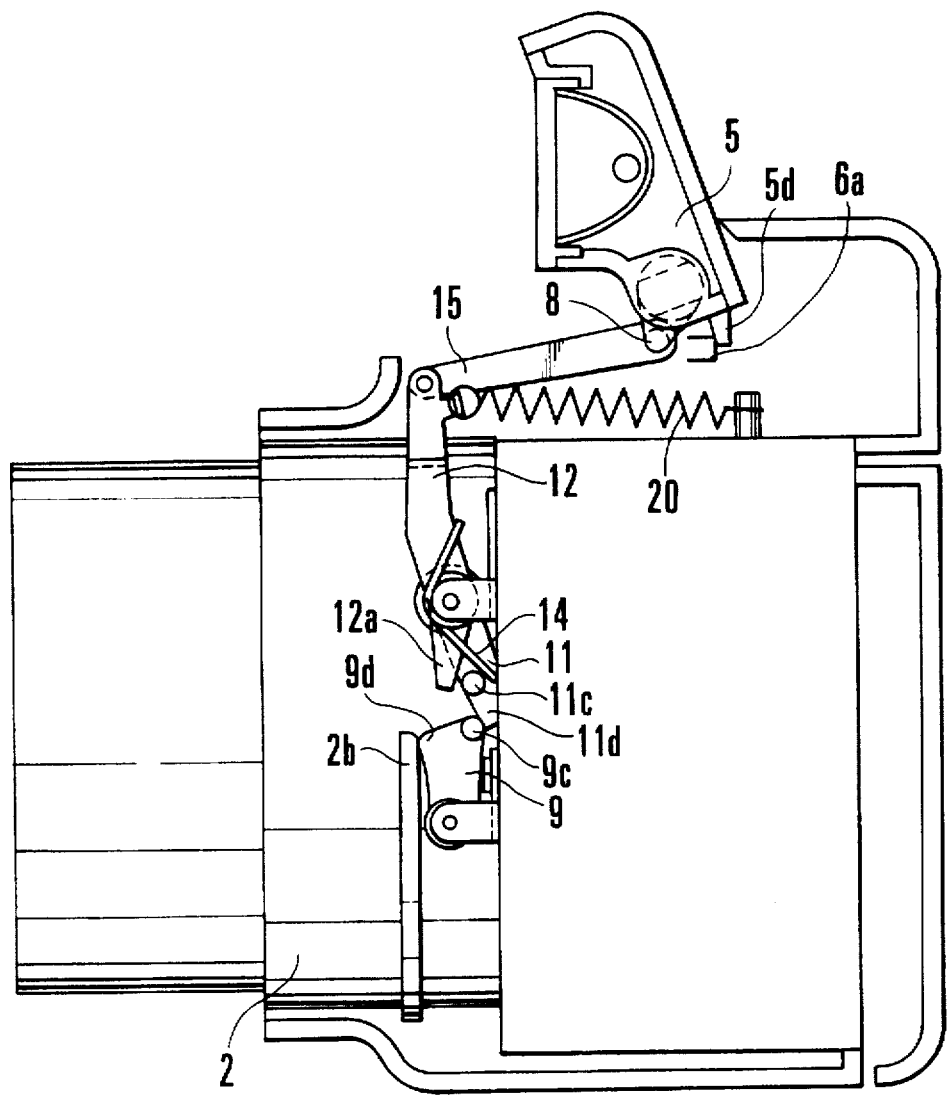
FIG. 3 is a sectional view showing the camera of FIG. 1 in a state in which the flash emitting unit is in a use position.

The swing of the third lever 12 causes the flash emitting unit 5 to begin to rotate in the direction of protruding by the interlocked connection of the connection rod 15 and the crank 8. When the lens sleeve 2 rotates further, a protruding part 5d formed on the flash emitting unit 5 comes to abut on a stopper part 6a of the base 6 to set the flash emitting unit 5 in the use position where flash emission is possible, as shown in FIG. 3. When the lens sleeve 2 rotates still further, the first lever 9 is pushed down until the rib-like protruding part 2b of the lens sleeve 2 reaches a top part 9d of the first lever 9. However, since the flash emitting unit 5 is not allowed to rotate as the stopper part 6a acts thereon at this time, the third lever 12 also does not swing and the second lever 11 is alone caused to swing by the first lever 9.

As a result, the protruding part 12a of the third lever 12 and the shaft 11c of the second lever 11 which are in contact with each other at the beginning are disposed away from each other. The flash emitting unit 5 is thus stably pushed to the use position (flash emittable position) by a load imposed by the torsion spring 14. The lens sleeve 2 rotates further to come to a stop in a predetermined position to bring the camera into a photographable state as shown in FIG. 3. FIG. 8 shows in a front view this photographable state of the camera shown in FIG. 3.

This state is a wide-angle state, if the photo-taking lens of the camera is a zoom lens.

If the lens sleeve 2 is rotated further counterclockwise, the photo-taking lens is drawn out further to bring about a telephoto state. Since the rib-like protruding part 2b is provided on the outer circumferential side of the lens sleeve 2, even in the telephoto state, the first lever 9 is always pushed by the rib-like protruding part 2b to have the flash emitting unit 5 stably pushed to the use position. In the camera according to the first embodiment of this invention, the flash emitting unit 5 is thus arranged to be always extruding in the photographable state to keep it ready for emitting light, so that a shot of any scene can be promptly taken without missing a shutter opportunity. The arrangement thus gives a camera of a good operability.

Figure 4:
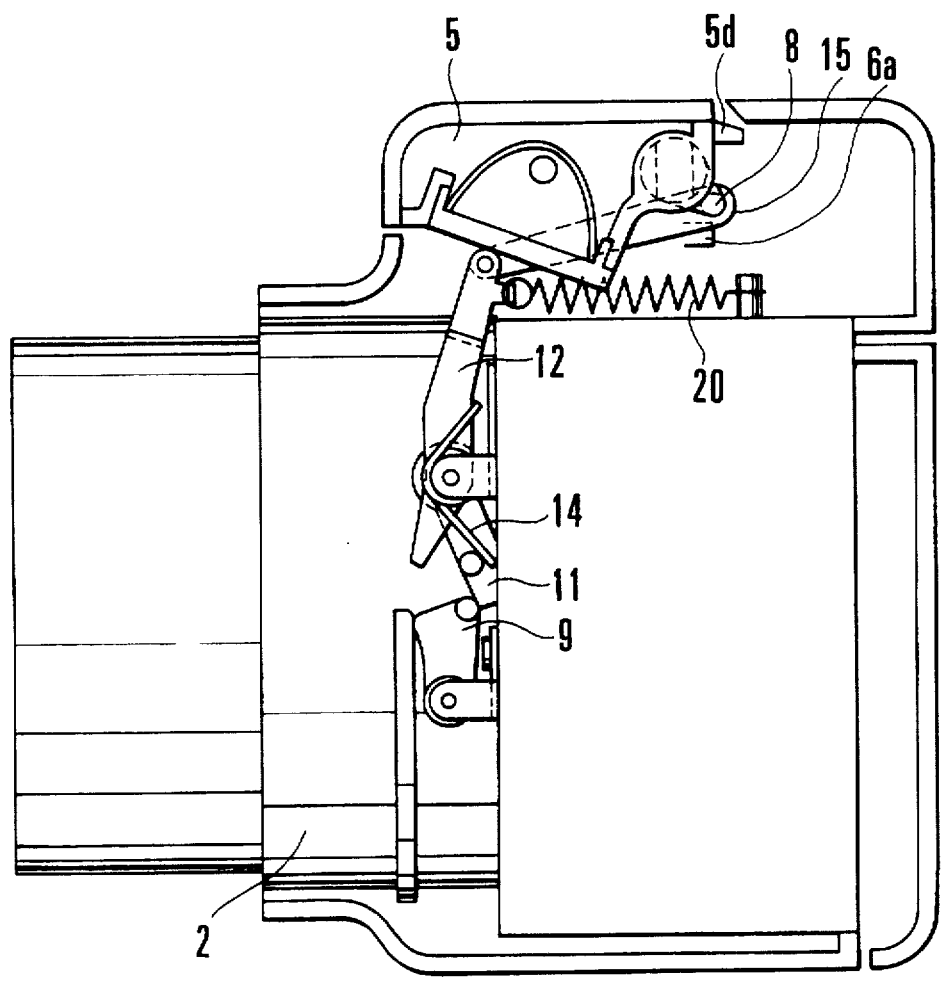
FIG. 4 is a sectional view showing the camera of FIG. 1 in a state in which the flash emitting unit has been pushed down by an external force from the state shown in FIG. 3.
Figure 5:
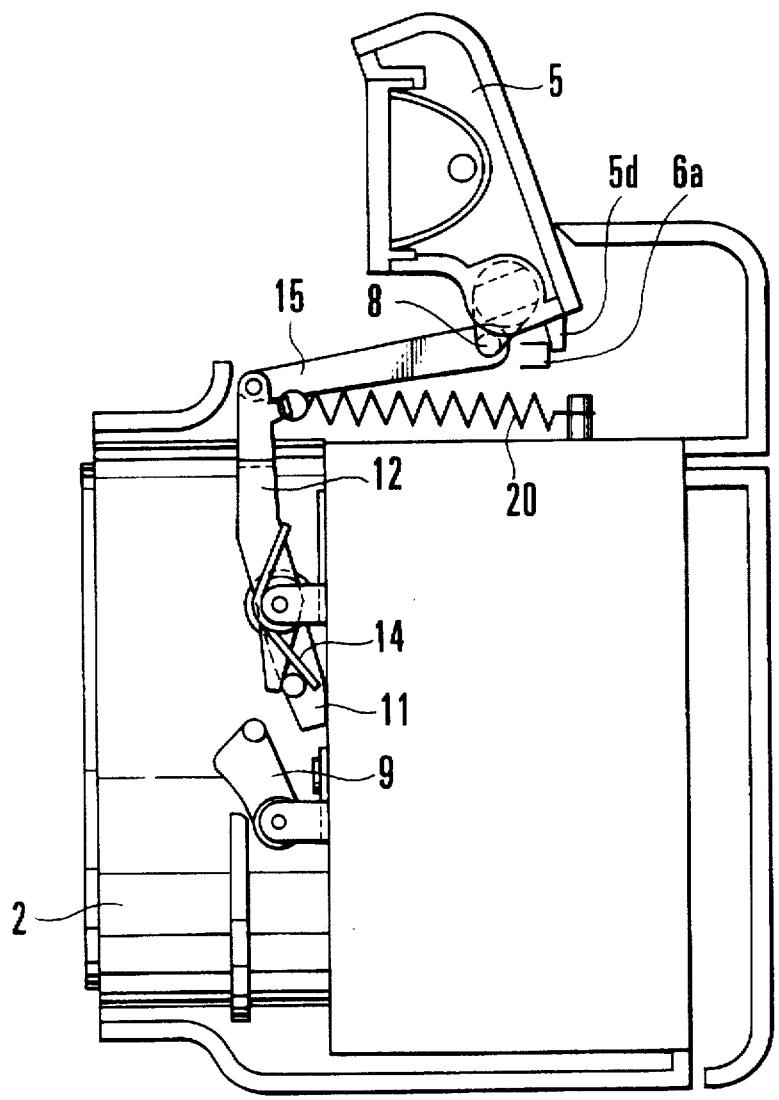
FIG. 5 is a sectional view showing the camera of FIG. 1 in a state in which the flash emitting unit has been fixed in position by an external force in the state shown in FIG. 2.

If some external force happens to be exerted on the flash emitting unit 5 while the flash emitting unit 5 is either in the protruding state or in the process of being protruded, thereby hindering the flash emitting unit 5 from moving, the external force causes only the torsion spring 14 to be charged by the third lever 12, as shown in FIG. 4, and leaves the motions of the first and second levers 9 and 11 intact, so that the related parts including the lens sleeve 2 are effectively prevented from being damaged.

A stowing action to be performed on the flash emitting unit 5 after completion of photographing is next described as follows. In this case, the lens sleeve 2 is rotated in a direction reverse to the direction in which the lens sleeve 2 is rotated in performing the protruding action described above. The motor 3 is energized in the reverse direction to cause through the gear train 4 the lens sleeve 2 to rotate clockwise as viewed in FIG. 1. The photo-taking lens (not shown) is caused through a cam groove and a cam follower to move in the direction of drawing in in association with the rotation of the lens sleeve 2. As the photo-taking lens retreats further from the wide-angle position shown in FIG. 3, the fore end of the rib-like protruding part 2b of the lens sleeve 2 comes to the slanting face 9b passing the top part 9d of the first lever 9. The first lever 9, which is urged counterclockwise, as viewed in FIG. 3, by the torsion spring 14 through the second lever 11 at this time, then comes to rotate counterclockwise following the rib-like protruding part 2b. The shaft 11c of the second lever 11 abuts on the protruding part 12a of the third lever 12 when the lens sleeve 2 further rotates to a certain degree of angle. At this point of time, the flash emitting unit 5 is freed from the pushing load imposed to the use position by the torsion spring 14. The flash emitting unit 5 is thus allowed to be caused by the spring 20 to swing toward the stowage position together with the second and third levers 11 and 12 in association with the counterclockwise swing of the first lever 9. When the lens sleeve 2 rotates further, the flash emitting unit 5 comes to a stop in the stowage position. The second and third lever 11 and 12 then also come to a stop.

After that, the lens sleeve 2 rotates to a certain degree of angle with the rib-like protruding part 2b having moved away from the slanting face 9b of the first lever 9. The lens sleeve 2 then comes to a stop upon detection of the fact that the photo-taking lens has come to its retracted position. The stowing action then comes to an end. If the stowing action happens to be prevented by some external force on the flash emitting unit 5, the external force causes only the rib-like protruding part 2b of the lens sleeve 2 to move away from the first lever 9 after the shaft 11c of the second lever 11 abuts on the protruding part 12a of the third lever 12. The third lever 12, the connection rod 15 and the flash emitting unit 5 are not affected and never damaged by such an external force. Further, no damage will be caused also when the flash emitting unit 5 happens to be pushed up while the stowing action is in process. In that event, the second and third levers 11 and 12 simply swing in association with the flash emitting unit 5 and the connection rod 15, and none of the related parts are damaged.

(Second Embodiment)

Figure 6:
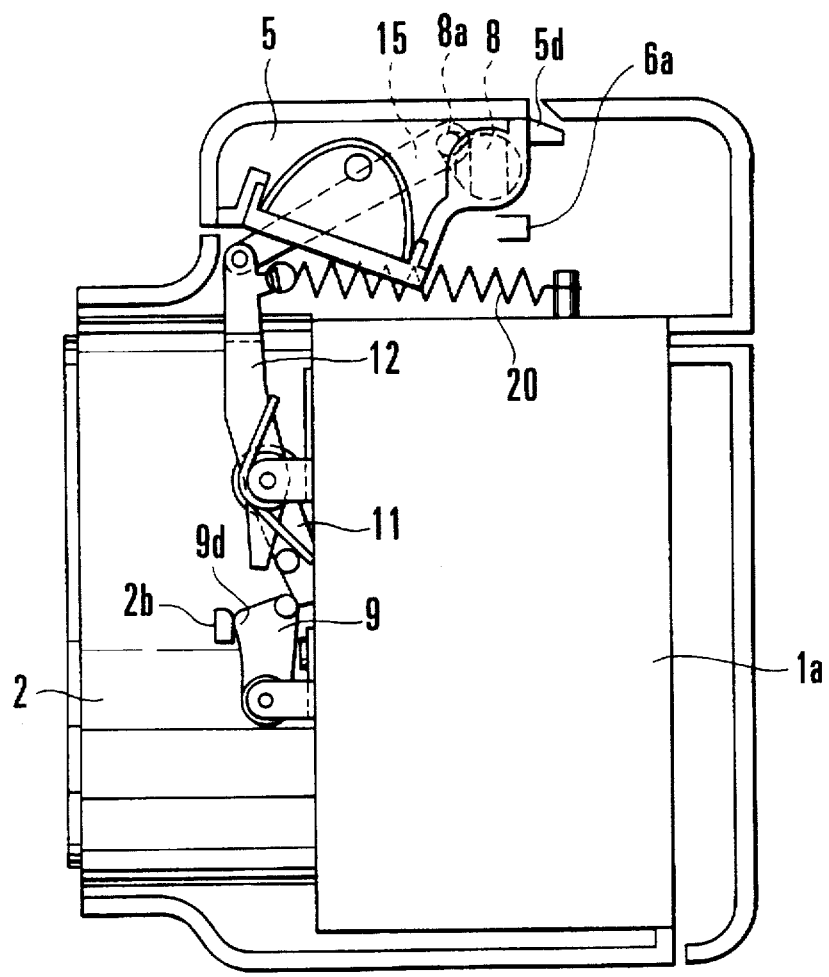
FIG. 6 is a sectional view showing a camera arranged as a second embodiment of this invention in a state in which a flash emitting unit is in a stowage position.
Figure 7:
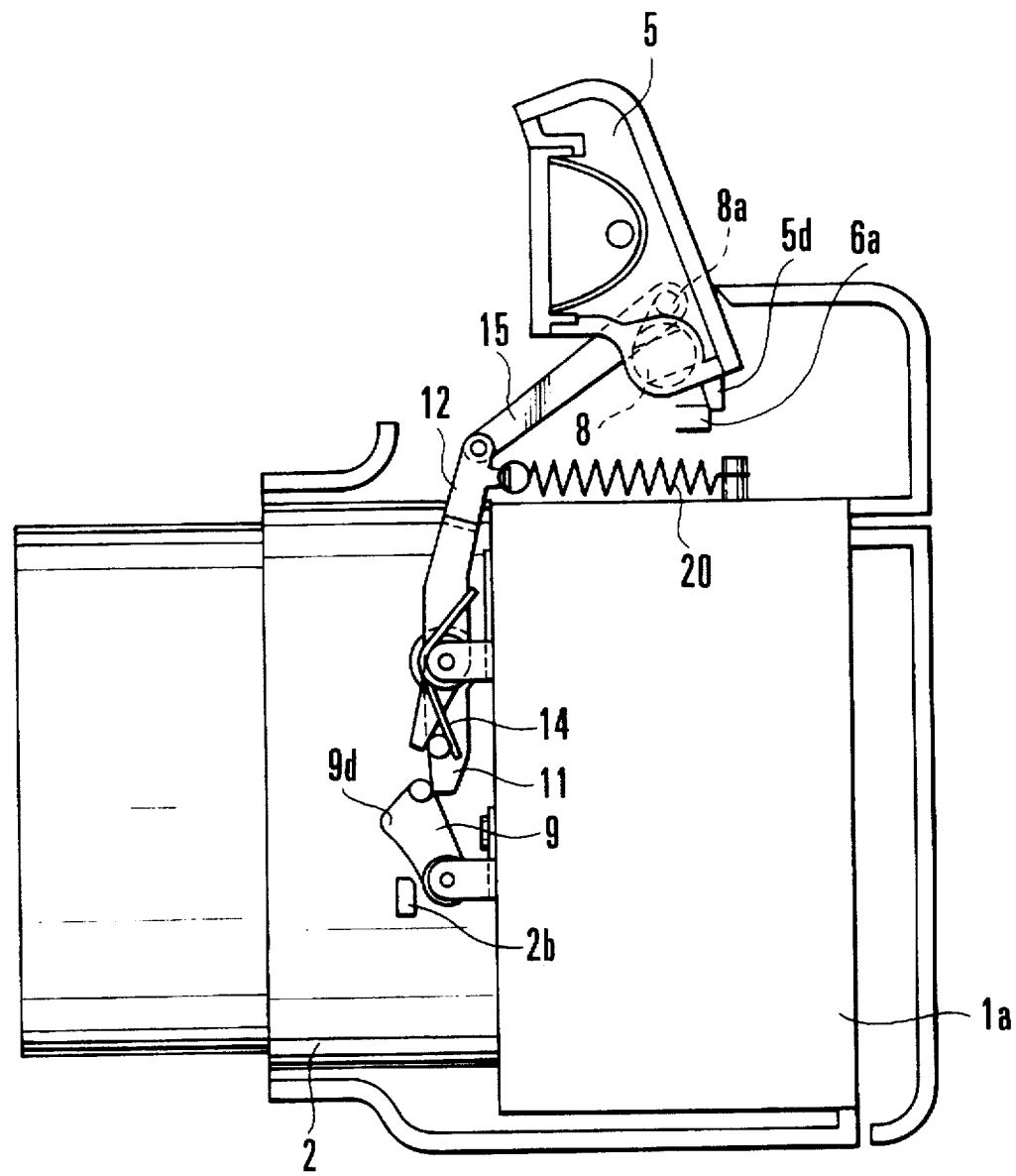
FIG. 7 is a sectional view showing the camera of FIG. 6 in a state in which the flash emitting unit is in a use position.

FIGS. 6 and 7 show a second embodiment of this invention. All the members of the second embodiment that are the same as those shown in FIGS. 1 to 5 are indicated by the same reference numerals in FIGS. 6 and 7, and the details of them are omitted from description. The second embodiment differs from the first embodiment in that the shaft 8a of the crank 8 which is connected to the connection rod 15 is located in a position higher than the center of rotation of the flash emitting unit 5. Accordingly, the urging force of the spring 20 acts to urge the flash emitting unit 5 to swing toward the use position. Therefore, in the second embodiment, the phase of the protruding and stowing actions on the flash emitting unit 5 becomes reverse to that of the first embodiment described in the foregoing. In other words, the flash emitting unit 5 is in the stowage position when the rib-like protruding part 2b of the lens sleeve 2 is riding on the top part 9d of the first lever 9, as shown in FIG. 6, and in the use position when the rib-like protruding part 2b is away from the top part 9d of the first lever 9, as shown in FIG. 7.

Unlike in the first embodiment, for moving the flash emitting unit 5 from the stowage position to the use position, the lens sleeve 2 rotates clockwise as viewed in FIG. 1. The photo-taking lens then moves from the retracted position through the wide-angle position to the telephoto position. Since the rib-like protruding part 2b of the lens sleeve 2 is required to push the first lever 9 only when the photo-taking lens is in the retracted position, its function can be fulfilled by arranging it only in a short protruding shape on the outer side of the lens sleeve 2 while, in the case of the first embodiment, it must be arranged to have a length as much as a rotatable range.

While the first and second embodiments have been described above on the assumption that the camera is a zoom lens camera, this invention is not limited to the camera of that type but is of course applicable also to cameras of any other types such as a single-focal-length camera and a two-focal-length camera, as long as the camera has a ring-like member arranged to cause a photo-taking lens to move back and forth and to change the position of the photo-taking lens between the retracted, nonphotographing position and the photographing position.

In other words, in each of the embodiments, the members related to the invention are arranged to carry out the specific actions while the camera is in process of being set into a photographable state unrelated to the photographing actions of the camera. At the end of the photographable state, these members drive the flash emitting unit to swing back to its original position.

(Third Embodiment)

Figure 10:
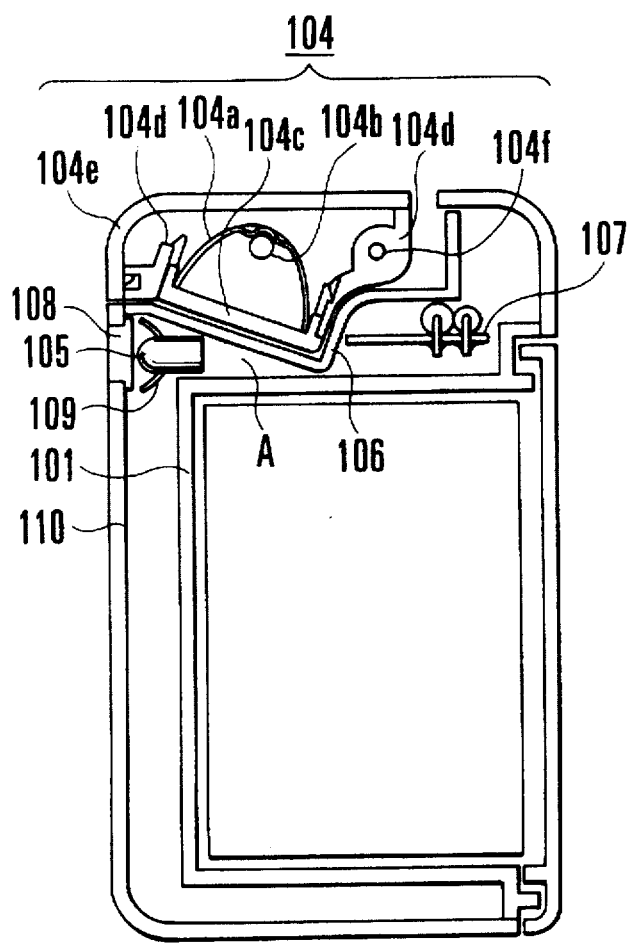
FIG. 10 is a sectional view showing a camera arranged as a third embodiment of this invention in a state in which a flash emitting unit is in a stowage position.
Figure 11:
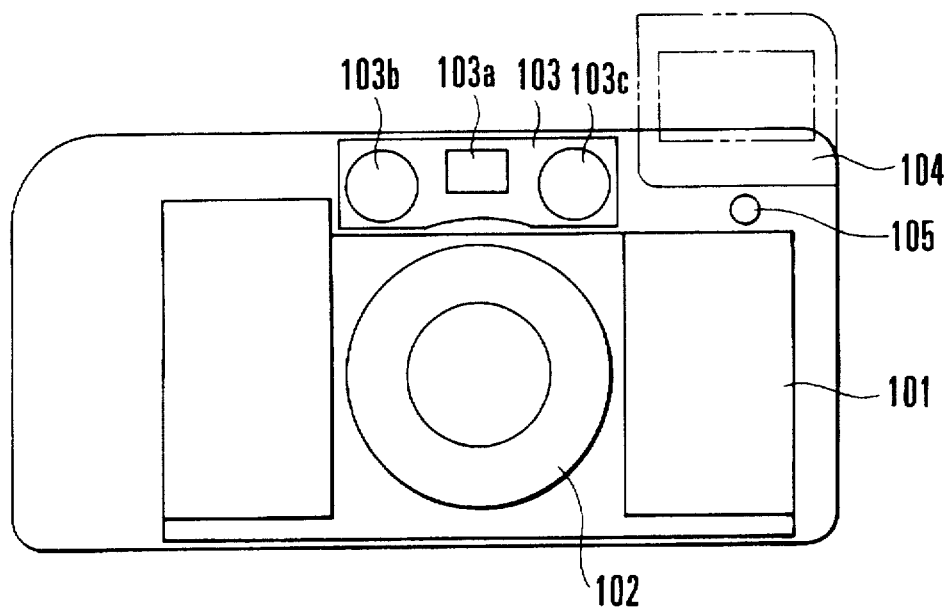
FIG. 11 is a front view showing the whole camera arrangement of the third embodiment.
Figure 12:
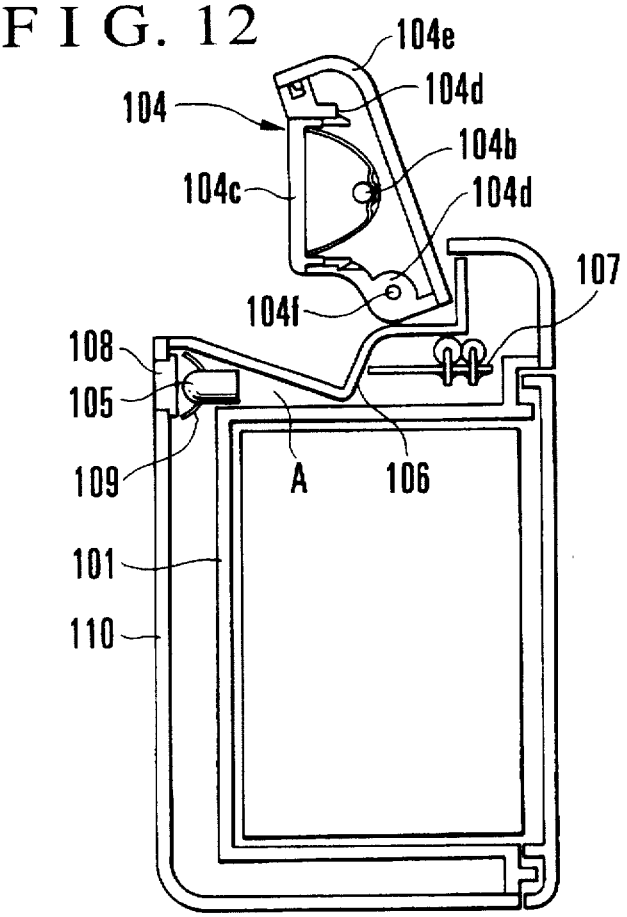
FIG. 12 is a sectional view showing the camera of FIG. 10 in a state in which the flash emitting unit is in a use position.

FIGS. 10, 11 and 12 relate to a camera which is a third embodiment of this invention. FIG. 10 is a side sectional view showing the camera in a state in which a flash emitting unit is in a stowage position. FIG. 11 shows the whole arrangement of the camera. FIG. 12 is a sectional view showing the camera in a state in which the flash emitting unit has been rotated into a use position where flash emission is possible. The flash emitting unit is arranged to be rotatable from the stowage position into the use position for the purpose of limiting the height of the flash emitting unit, so that the camera can be configured in a smaller size.

Referring to FIG. 11, the illustration includes a camera body 101, a photo-taking lens 102 and an AF block 103 into which a viewfinder and a distance measuring unit are unified, and a flash emitting unit 104. The AF block 103 is provided with a viewfinder objective window 103a and distance measuring windows 103b and 103c. The flash emitting unit 104 is shown as in the stowage position. In FIG. 11, two-dot chain lines indicate the use position of the flash emitting unit 104. The flash emitting unit 104 is arranged to permit photographing indoors or at night at a high shutter speed by flashing a very large amount of light in synchronism with the operation of a shutter mechanism. A red-eye reducing lamp 105 is arranged to lessen the red-eye phenomenon by flashing the lamp 105 to cause the pupils of the object of shooting (a person or persons) to contract before the flash emitting unit 104 is allowed to flash.

Referring to FIG. 10, a flash reflection shade 104a is arranged to be in a parabolic shape. A flash lamp 104b is, for example, a flash lamp called a flash gun or a strobe-light lamp. Reference numeral 104c denotes a flash window. A casing 104d is arranged to house these parts. Reference numeral 104e denotes a cover member. A shaft 104f is arranged to allow the flash emitting unit 104 to rotate thereon. A base plate 106 is arranged to shut off the inside of the camera from the outside when the flash emitting unit 104 is in the use position as shown in FIG. 12. A circuit board 107 is arranged to have, for example, a synchronizing contact provided thereon for synchronizing the flash emission with a shutter speed.

The optical axis of the flash emitting unit 104 is at an angle of declination of about 70 degrees to the optical axis of the photo-taking lens 102, when the flash emitting unit 104 is in the stowage position. In other words, the flash window 104c rotates (or swings) over a range of angle of about 70 degrees when the flash emitting unit 104 moves from the stowage position to the use position. This angle is variable according to the total height of the camera, a distance from a photo-taking optical axis, a means for rotating the flash emitting unit 104, etc.

Reference numeral 108 denotes a lamp window. Reference numeral 109 denotes a reflection shade for the red-eye reducing lamp 105. Reference numeral 110 denotes an exterior cover member. As shown In FIG. 10, the red-eye reducing lamp 105 and the reflection shade 109 are disposed in an approximately-conical extra space A encompassed with the base plate 106, the camera body 101 and the exterior cover member 110. This extra space A is not obtained by forcibly moving any of the flash emitting unit 104, the camera body 101 and the exterior cover member 110 but naturally results from the angle of swing or rotation of the flash emitting unit 104. The extra space A is not large enough for having a large part or unit, such as a distance measuring unit or the like, but is highly suited for the red-eye reducing lamp 105 as it is located on the inner side of the front wall of the camera.

(Fourth Embodiment)

Figure 13:
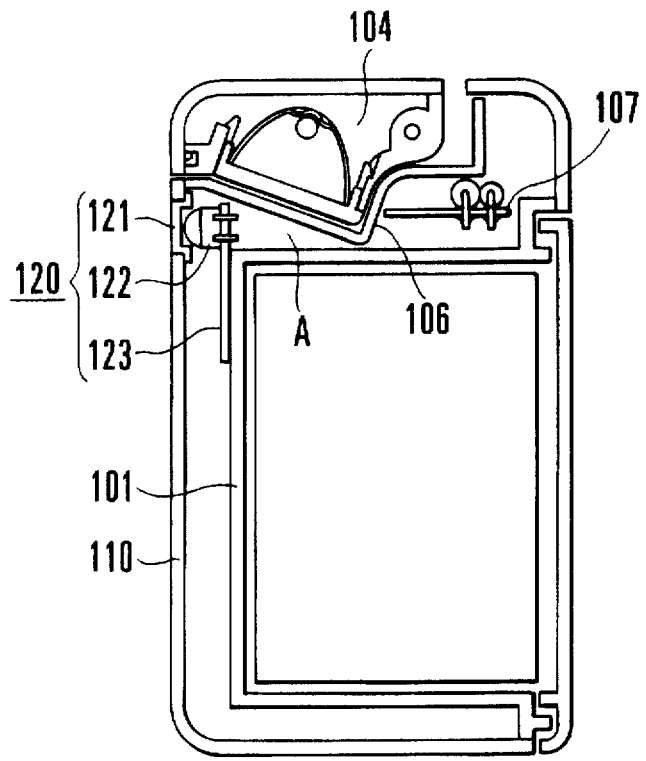
FIG. 13 is a sectional view showing a camera arranged as a fourth embodiment of this invention in a state in which a flash emitting unit is in a stowage position.

FIG. 13 shows a fourth embodiment of this invention. The fourth embodiment is the same as the third embodiment except that a receiving part 120 for a remote control operation is disposed in the extra space A in place of the red-eye reducing lamp 105 of the third embodiment. Referring to FIG. 13, the receiving part 120 includes a light receiving window 121, a light receiving sensor 122 and a receiving circuit board 123. Like in the case of the third embodiment, the extra space A which is in the front part of the camera is advantageously used for arranging the receiving part 120 for remote control.

Further, in this case, since the extra space A extends in the direction of the width (in the transverse direction) of the flash emitting unit 104 as shown in FIG. 10, the red-eye reducing lamp 105 may be arranged by the side of the remote control receiving part 120. The red-eye reducing lamp 105 also may be arranged in a space left vacant by disposing the remote control receiving part 120 in the extra space A.

(Fifth Embodiment)

Figure 14:
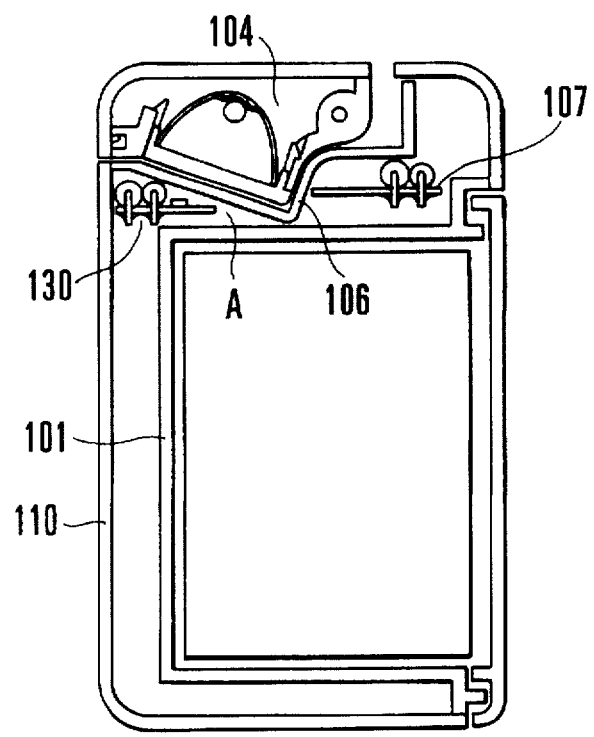
FIG. 14 is a sectional view showing the camera of FIG. 13 in a state in which the flash emitting unit is in a use position.

FIG. 14 shows a fifth embodiment of this invention. The fifth embodiment is arranged in the same manner as the fourth embodiment except that a flash circuit board 130 is disposed within the extra space A as a part of a circuit board provided for controlling flash emission. Since the extra space A is limited in the direction of height, the circuit board 130 is arranged to mount thereon a relatively small electric element. It is preferable, for example, to arrange a trigger circuit there for control over the timing of flash emission.

In the case of the fifth embodiment, the red-eye reducing lamp 105 and the remote control receiving part 120 may be disposed in the extra space A like in the third and fourth embodiments and may be mounted on the circuit board 130. It is also possible to have the red-eye reducing lamp 105 and the remote control receiving part 120 disposed in a space left vacant by arranging the circuit board 130 in the extra space A.

In each of the embodiments described above, the flash emitting unit is arranged to have its axis of rotation (swing) in the horizontal direction, i.e., in the direction of film transport. However, this invention is not limited to this direction. The same advantageous effect can be attained with this direction changed to any other direction as long as the direction is orthogonal to the photo-taking optical axis of the camera.

This invention is applicable also to an apparatus using an image recording medium other than a film.

Further, this invention applies also to a film cartridge of the kind having a magnetic recording part formed for each of picture frames of film with the whole film stowed within a film case beforehand, to a film cartridge of any other kind or even to a cartridge which contains an image recording medium other than a film.

This invention may be carried out by combining as necessary the embodiments or their technological elements described in the foregoing.

Further, this invention is applicable to cameras of varied kinds, such as a single-lens reflex camera, a lens-shutter type camera, a video camera, etc., optical apparatuses other than cameras, other apparatuses, devices adapted for cameras, optical apparatuses and other apparatuses, and component elements forming these apparatuses and devices.

What is claimed is:

1. A camera having a flash device and a film accommodating chamber, comprising:
   a) a flash emitting unit arranged to be movable between a use position and a stowage position;
   b) driving means for driving a lens sleeve so as to move an optical element disposed within said lens sleeve;
   c) a first member arranged to move in association with a movement of said lens sleeve;
   d) a second member arranged to drive said flash emitting unit; and
   e) a spring member arranged to interconnect said first member and said second member to transmit a movement of said first member to said second member, wherein said spring member is located between said lens sleeve and said film accommodating chamber.

2. A camera according to claim 1, wherein said flash emitting unit is arranged to rotate on an axis of rotation which is orthogonal to a photo-taking optical axis of said camera, and wherein said first member and said second member are arranged to swing on axes which are in parallel to said axis of rotation.

3. A camera according to claim 2, wherein a crank shaft is formed on the axis of rotation of said flash emitting unit, and wherein said second member is connected to said crank shaft.

4. A camera according to claim 1, wherein a protruding part is formed on said lens sleeve and a cam part arranged to come contact with said protruding part is formed on said first member, and wherein said first member is arranged to be moved by sliding contact between said protruding part and said cam part caused by the movement of said lens sleeve.

5. A camera according to claim 1, wherein said second member is given an urging force for urging said flash emitting unit to move toward the stowage position.

6. A camera according to claim 1, wherein said second member is given an urging force for urging said flash emitting unit to move toward the use position.

7. A camera having a flash device and a camera body on which an approximately semicircular cylindrical protruding part is formed, comprising:
   a) a flash emitting unit arranged to be movable between a use position and a stowage position;
   b) driving means for driving a lens sleeve so as to move an optical element disposed within said lens sleeve;
   c) a first member arranged to move in association with a movement of said lens sleeve;
   d) a second member arranged to drive said flash emitting unit; and
   e) a spring member arranged to interconnect said first member and said second member to transmit a movement of said first member to said second member, wherein said spring member is located between said lens sleeve and said approximately semicircular cylindrical protruding part.

8. A camera according to claim 7, wherein said flash emitting unit is arranged to rotate on an axis of rotation which is orthogonal to a photo-taking optical axis of said camera, and wherein said first member and said second member are arranged to swing on axes which are in parallel to said axis of rotation.

9. A camera according to claim 8, wherein a crank shaft is formed on the axis of rotation of said flash emitting unit, and wherein said second member is connected to said crank shaft.

10. A camera according to claim 7, wherein a protruding part is formed on said lens sleeve, and a cam part arranged to come contact with said protruding part is formed on said first member.

11. A camera having a flash device and a film accommodating chamber, comprising:
    a) a flash emitting unit arranged to be movable between a use position and a stowage position by rotating on an axis of rotation which is orthogonal to a photo-taking optical axis of said camera;
    b) driving means for driving a lens sleeve so as to move an optical element disposed within said lens sleeve; and
    c) a transmission mechanism arranged to transmit a driving force of said lens sleeve to said flash emitting unit, wherein said transmission mechanism is located between said lens sleeve and said film accommodating chamber and has a lever member arranged to swing on an axis which is in parallel to said axis of rotation.

12. A camera according to claim 11, wherein said transmission mechanism has two lever members arranged to swing on axes which are in parallel to said axis of rotation and a spring member arranged to interconnect said two lever members, and wherein, when a load larger than a predetermined load is imposed on said transmission mechanism, said spring is charged by the load in such a way as to prevent said transmission mechanism from being damaged.

* * * * *

UNITED STATES PATENT AND TRADEMARK OFFICE
CERTIFICATE OF CORRECTION

PATENT NO. : 5,749,003
DATED : May 5, 1998
INVENTOR(S) : Minoru Tanabe

It is certified that error appears in the above-identified patent and that said Letters Patent is hereby corrected as shown below:

Title Page, Item [75], delete "Kawasaki" and insert -- Kanagawa-ken --.

Signed and Sealed this

First Day of December, 1998

Attest:

BRUCE LEHMAN

*Attesting Officer*         *Commissioner of Patents and Trademarks*